United States Patent Office

3,583,871
Patented June 8, 1971

3,583,871
ARTIFICIAL FEED FOR SILKWORMS AND
METHOD OF USING THE SAME
Masazumi Niimura, Kamakura-shi, Shigeo Matsubara, Kawasaki-shi, and Takehisa Sakakibara and Jiro Kirimura, Tokyo, Japan, assignors to Ajinomoto Co., Inc., and Katakura Industry Co., Ltd., both of Tokyo, Japan
No Drawing. Filed Apr. 1, 1968, Ser. No. 717,946
Int. Cl. A23k 1/00; A23j 1/14
U.S. Cl. 99—2                                      9 Claims

ABSTRACT OF THE DISCLOSURE

Silkworms having completed at least the second instar stage can be raised successfully on a gelatinous, water-bearing feed containing maize and/or sorghum with soy bean solids as the principal nutritive ingredient even if the combined amount of the maize and/or sorghum with soy bean solids exceeds 50% of the dry feed weight and the feed is free from mulberry leaves or feed products containing mulberry leaf solids. Minor amounts of mixed antibiotics, when added to the feed, protect the silkworm larvae from flacherie.

BACKGROUND OF THE INVENTION

This invention relates to silkworm feed and to a method of raising silkworms.

It has been proposed heretofore to raise silkworms on feed other than mulberry leaves, and such feeds will be referred to hereinafter as "artificial feeds." However, the known types of artificial feed are inferior to natural mulberry leaves in promoting the growth of the silkworm larvae and in the weight of the cocoons produced.

SUMMARY OF THE INVENTION

We have now found that the silkworm, which was considered for a long time a monophagous insect eating only mulberry leaves, also eats maize and/or sorghum, and that an artificial feed containing maize and/or sorghum may be enriched with soybeans as an additional protein source. Silkworm larvae raised on the artificial feed of the invention produce cocoons of good weight. While maize or sorghum have been used as a general animal feed, attempts at raising silkworm larvae on maize or sorghum have not been made heretofore.

It has been found that the newly hatched larvae are strictly monophagous, eating only mulberry leaves or products whose nutritive ingredients mainly consist of mulberry leaf solids. However, the feeding habits of silkworm larvae can be changed during their growth, and the larvae eat an artificial feed containing 50–90% water if in a gelatinous state and having a hardness of $10^4$–$10^7$ dyne/cm.$^2$ (20° C.) as measured with a curd tension meter produced by Iio Electric Co., Tokyo, Japan, type M301–A which mainly consists of a spring balance connected with a sensing spindle against which a sample of feed is raised on a movable plate at a uniform rate and without vibration. Hardness is measured at 20° C. and is shown on a balance scale in dyne/cm.$^2$.

We have succeeded in raising newly hatched silkworm larvae at least up to 2nd instar on an artificial feed containing soy bean solids and maize and/or sorghum with a small amount of mulberry leaves, and thereafter on an artificial feed containing soy bean solids and maize and/or sorghum without mulberry leaves or mulberry leaf solids.

The maize used for this invention is derived from thef ruit of millet corn, or Indian corn, Zea mays L, including dental corn, flint corn, waxy corn and lysine-rich corn. Sorghum is Sorghum vulgare and includes guinea corn, kaoliang, milo, grain sorghum and kafir.

Whole kernels of maize or sorghum are crushed to particles which pass through a 10 mesh screen and preferably a 50 mesh screen. The combined amount of maize, sorghum, and soybean in the feed of the invention is 50% or more, preferably 85–97% by weight on a dry basis, and it may also be desirable to add small amounts of known supplemental ingredients of artificial silkworm feeds such as sterols, vitamins and minerals, also starch and cellulose powder. The ratio of maize and sorghum to soybeans should be between 1:9 and 9:1 by weight, preferably between 1:1 and 4:1. If necessary, corn starch is added for proper consistency of the feed and is heated with the aqueous mixture to 100° C. for about 5–40 min. to form a hydrogel on cooling.

The artificial feed of this invention is not limited in its use to specific strains of silkworms but may be fed to all useful insects belonging to the families Bombycidae and Saturuniidae, such as Bombyx mori, Philosamia synthia ricini, Anthereae pernyi, Anthereae mylitta and Anthereae yamamai.

DESCRIPTION OF PREFERRED EMBODIMENTS

The invention is further illustrated by the following examples.

Example 1

Five groups of newly hatched silkworm larvae of the species Bombyx mori were raised up to their 4th instar on the artificial feed shown in Table I, and from the 5th instar stage on respective artificial feed compositions shown in Table II at 23° C. at 70% relative humidity. All the feed particles passed through an 80 mesh screen, and each feed mixture was cooked for 20 min. at 100° C. Forty silkworms were in each group.

As shown in Table II, feed A–1 contained maize and sorghum with soybean solids, feed A–2 contained maize and sorghum without soybean solids, feed A–3 contained soybean without maize or sorghum, feed B was of the type reported by T. Ito (The Journal of Sericultural Science of Japan (in Japanese) 31, 73 (1962)) and feed C was of the type reported by Y. Hamamura et al. (The Journal of the Agricultural Chemical Society of Japan (in Japanese), 37, 736 (1963)).

TABLE I

|  | G. |
|---|---|
| Mulberry leaf powder | 10 |
| Defatted soybean meal | 60 |
| Dental corn | 12 |
| Agar | 10 |
| Soybean oil | 3 |
| Trace nutrients [1] | 5 |
| Water | 300 |

[1] 0.3 g. soybean sterol, 1 g. citric acid, 1.5 g. minerals, 2 g. vitamic C, and 0.2 g. vitamin B complex. Also used in other examples.

TABLE II

|  | A-1 | A-2 | A-3 | B | C |
|---|---|---|---|---|---|
| Dental corn (g.) | 45 | 40 |  |  |  |
| Milo (g.) | 20 | 55 |  |  |  |
| Mulberry leaf powder (g.) |  |  | 60 |  |  |
| Cellulose powder (g.) |  |  |  |  | 52 |
| Defatted soybean meal (g.) | 30 |  | 95 | 25 | 20 |
| Starch (g.) |  |  |  | 10 | 15 |
| Glucose (g.) |  |  |  | 5 |  |
| Saccharose (g.) |  |  |  |  | 10 |
| Trace nutrients (g.) | 5 | 5 | 5 |  |  |
| Vitamin B complex (g.) |  |  |  |  | 0.1 |
| Vitamin C (g.) |  |  |  | 1.5 | 0.4 |
| Chlorogenic acid (g.) |  |  |  |  | 1 |
| Minerals (g.) |  |  |  |  | 0.9 |
| β-Sitosterol (g.) |  |  |  |  | 0.5 |
| Innositol (g.) |  |  |  |  | 0.5 |
| Water (g.) | 300 | 300 | 300 | 167 | 150 |
| Hardness (dynes/cm.$^2$ at 20° C.) | $9.5 \times 10^5$ | $1.8 \times 10^5$ | $3.0 \times 10^5$ | $4.6 \times 10^5$ | $3.4 \times 10^5$ |

TABLE III

|  | A-1 | A-2 | A-3 | B | C |
|---|---|---|---|---|---|
| Average weight of fully-grown silkworms (g.) | 5.7 | 3.2 | 4.8 | 3.0 | 2.1 |
| Larvae spinning cocoon (percent) | 100.0 | 80.0 | 87.5 | 70.0 | 30.0 |
| Average weight of cocoon layer (g.) | 0.44 | 0.26 | 0.34 | 0.20 | 0.08 |

The results obtained are shown in Table III.

Example II

Four groups of newly hatched silkworm larvae were raised up to their 4th instar on the artificial feed shown in Table I, and the several groups of larvae were raised from the 5th instar stage on the respective artificial feeds shown in Table IV.

TABLE IV

|  | D-1 | D-2 | D-3 | D-4 |
|---|---|---|---|---|
| Dental corn (g.) | 45 | 45 | 45 | 45 |
| Milo (g.) | 25 | 25 | 25 | 25 |
| Defatted soybean meal (g.) | 25 | 25 | 25 | 25 |
| Trace nutrients (g.) | 5 | 5 | 5 | 5 |
| Water (g.) | 300 | 300 | 300 | 80 |
| Cooking time at 100° C. (min.) | 20 | 0.5 | 20 | 20 |
| Particle size of corn (mesh) | 80 | 80 | 5 | 80 |
| Hardness (dynes/cm.$^2$ at 20° C.) | $7.8 \times 10^5$ | $7.8 \times 10^2$ | $8.1 \times 10^3$ | $2.4 \times 10^7$ |

TABLE V

|  | D-1 | D-2 | D-3 | D-4 |
|---|---|---|---|---|
| Average weight of fully-grown silkworms (g.) | 5.6 | 1.5 | 2.3 | 1.3 |
| Larvae spinning cocoon (percent) | 100.0 | 0.0 | 2.5 | 5.0 |
| Average weight of cocoon layer (g.) | 0.43 |  | 0.06 | 0.07 |

The results listed in Table V show the importance of the method for preparing said feed, including cooking conditions, the size of the corn particles and moisture on the growth of the larvae and the quality of the cocoons.

Example III

Ten groups of newly hatched silkworm larvae were raised up to their 3rd instar on the artificial feed of Table I and thereafter seven groups of larvae at the 4th instar stage were raised respectively on the feed compositions shown in Table VI. All the feed particles of these compositions passed through an 80 mesh screen, and the compositions were cooked 30 minutes at 100° C.

The 8th, 9th and 10th groups of larvae were respectively raised on feed B, C (see Table II) and F (only mulberry leaves). Forty silkworms were in each group and were raised at 25° C., 70% relative humidity.

TABLE VI

|  | E-1 | E-2 | E-3 | E-4 | E-5 | E-6 | E-7 |
|---|---|---|---|---|---|---|---|
| Dental corn (g.) | 25 | 40 | 30 | 65 |  | 25 | 20 |
| Milo (g.) | 50 | 20 | 15 |  | 65 | 25 | 10 |
| Defatted soybean meal (g.) | 20 | 35 | 50 | 30 | 30 | 25 | 20 |
| Trace nutrients (g.) | 5 | 5 | 5 | 5 | 5 | 5 | 5 |
| Corn starch (g.) |  |  |  |  |  | 20 | 25 |
| Cellulose powder (g.) |  |  |  |  |  |  | 20 |
| Water (g.) | 300 | 300 | 300 | 300 | 300 | 300 | 300 |
| Hardness (dynes/cm.$^2$ at 20° C.) | $8.7 \times 10^5$ | $7.2 \times 10^5$ | $9.0 \times 10^5$ | $8.6 \times 10^5$ | $8.3 \times 10^5$ | $8.6 \times 10^5$ | $6.4 \times 10^5$ |

The results obtained are shown in Table VII.

TABLE VII

|  | E-1 | E-2 | E-3 | E-4 | E-5 | E-6 | E-7 | B | C | F |
|---|---|---|---|---|---|---|---|---|---|---|
| Average weight of molting larvae in 3rd instar (mg.) | 140 | 140 | 140 | 140 | 140 | 140 | 140 | 140 | 140 | 140 |
| Average weight of molting larvae in 4th instar (mg.) | 841 | 872 | 848 | 827 | 830 | 803 | 795 | 560 | 503 | 795 |
| Average weight of fully grown silkworms (g.) | 5.4 | 6.1 | 5.8 | 5.1 | 5.0 | 4.3 | 4.5 | 3.2 | 2.0 | 4.0 |
| Larvae spinning cocoon (percent) | 100 | 100 | 100 | 98 | 98 | 95 | 95 | 78 | 35 | 93 |
| Average weight of cocoon (g.) | 2.5 | 3.0 | 2.7 | 2.8 | 2.6 | 2.4 | 2.3 | 1.3 | 0.91 | 1.6 |
| Average weight of cocoon layer (percent) | 0.40 | 0.46 | 0.42 | 0.43 | 0.41 | 0.39 | 0.38 | 0.22 | 0.10 | 0.38 |

It has further been found that the silkworm larvae were protected against flacherie due to alkalophilic lactic acid bacteria (such as *Streptococcus faecalis, Streptococcus faecium* var *mobilis* and Lactobacillus), if the feed of the invention contained penicillin, tetracycline, oxytetracycline, chlorotetracycline, together with a macrolide antibiotic such as erythromycin, leucomycin, oleandmycin, picromycin, methymycin, carbomycin or spiramycin. The combined antibiotics should generally amount to 0.1–0.001% of the feed on a dry basis to prevent or cure flacherie.

Example IV

Antibiotics were added to the feed E–2 (see Table VI). Penicillin and other antibiotics were combined in respective amounts of 60 units/gr. dry feed and 0.1 mg./gr. dry feed. When only one antibiotic was used, the dosage was twice the respective amount. Alkalophilic lactic acid bacteria were inoculated into the feed compositions. Groups of ten silkworms (newly molted 5th instar) were raised aseptically on the several compositions for 7 days at 25° C., at 70% relative humidity. Table VIII lists the average body weight of the 7-day old 5th-instar larvae, and the count of pathogenic bacterial cells in one gram of their feces on the following scale:

$+++$ = more than $10^7$ cells
$++$ = $10^5$–$10^7$ cells
$+$ = $10^2$–$10^4$ cells
$\pm$ = 1–10 cells
$-$ = none

TABLE VIII

| | Average weight (g.) | Number of bacterial cells |
|---|---|---|
| Streptomycin | 1.85 | +++ |
| Penicillin | 3.01 | + |
| Tetracycline | 3.08 | ++ |
| Chloramphenicol | 3.10 | ++ |
| Erythromycin | 2.35 | ++ |
| Leucomycin | 2.50 | ++ |
| Picromycin | 2.00 | +++ |
| Carbomycin | 1.95 | ++ |
| Oleandmycin | 2.40 | ++ |
| Penicillin plus kanamycin | 1.98 | ++ |
| Penicillin plus tetracycline | 2.20 | ++ |
| Penicillin plus erythromycin | 4.65 | ± |
| Penicillin plus leucomycin | 5.00 | − |
| Penicillin plus oleandmycin | 5.10 | − |
| Penicillin plus picromycin | 4.90 | ± |
| Penicillin plus methymycin | 4.70 | ± |
| Penicillin plus spiramycin | 4.83 | − |
| Penicillin plus carbomycin | 4.32 | ± |
| Tetracycline plus erythromycin | 5.05 | − |
| Tetracycline plus leucomycin | 5.10 | − |
| Tetracycline plus oleandmycin | 5.00 | − |
| Tetracycline plus picromycin | 4.83 | − |
| Penicillin plus leucomycin plus oxytetracycline | 4.81 | − |
| Penicillin plus oleandmycin plus oxytetracycline | 4.90 | − |
| Tetracycline plus leucomycin plus oleandmycin | 5.07 | − |
| Tetracycline plus erythromycin plus chloramphenicol | 4.95 | − |

We claim:
1. A feed composition for silkworms essentially consisting of a hydrogel containing at least 50% on a dry basis of soy bean solids and nutritive material selected from the group consisting of maize, guinea corn, kaoliang, milo, grain sorghum, and kafia, the hardness of said hydrogel being $10^4$ to $10^7$ dyne/cm.$^2$ at 20° C.
2. A composition as set forth in claim 1, wherein the amount of said soy bean solids is between 1/9 and 9 times the amount of said nutritive material on said dry basis.
3. A composition as set forth in claim 2 which is free from mulberry leaf solids.
4. A composition as set forth in claim 1 containing a first antibiotic selected from the group consisting of penicillin, tetracycline, oxytetracycline, and chlorotetracycline, and a second antibiotic which is a macrolide, the respective amounts of said first and second antibiotics being sufficient to protect silkworms from flacherie when said silkworms feed on said composition, and the combined amount of said first and second antibiotics being between 0.1 and 0.001 percent of said composition on said dry basis.
5. A method of raising silkworms which comprises feeding said silkworms the feed composition of claim 1.
6. A method of raising silkworms which comprises feeding said silkworms the feed composition of claim 2.
7. A method of raising silkworms which comprises feeding said silkworms the feed composition of claim 3.
8. A method as set forth in claim 7, wherein said silkworms have at least completed the second instar stage.
9. A method of raising silkworms which comprises feeding said silkworms the feed composition of claim 4.

References Cited

UNITED STATES PATENTS

| 3,093,483 | 6/1963 | Ishler et al. | 99—131 |
| 3,275,446 | 9/1966 | Hamamura et al. | 99—2 |
| 3,155,520 | 1/1964 | Ziffer | 99—2 |
| 3,230,930 | 1/1966 | Hamamura et al. | 99—2 |
| 3,244,527 | 4/1966 | Baker | 99—2 |
| 3,328,170 | 6/1967 | Hamamura et al. | 99—2 |
| 3,425,838 | 2/1969 | Kamada | 99—2 |
| 3,465,721 | 9/1969 | Miyazawa | 99—2 |
| 3,488,196 | 1/1970 | Niimura | 99—2 |

NORMAN YUDKOFF, Primary Examiner

C. P. RIBANDO, Assistant Examiner

U.S. Cl. X.R.

99—98, 131; 119—6, 51